(12) United States Patent
Hayashida et al.

(10) Patent No.: US 6,915,591 B2
(45) Date of Patent: Jul. 12, 2005

(54) ROTARY MOVEMENT CONVERTING MECHANISM AND MEASURING INSTRUMENT

(75) Inventors: Shuuji Hayashida, Kawasaki (JP); Yuji Fujikawa, Kawasaki (JP); Osamu Saito, Kawasaki (JP); Masamichi Suzuki, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/731,791

(22) Filed: Dec. 9, 2003

(65) Prior Publication Data

US 2004/0118004 A1 Jun. 24, 2004

(30) Foreign Application Priority Data

Dec. 10, 2002 (JP) ........................................ 2002-357991
Oct. 24, 2003 (JP) ........................................ 2003-364390

(51) Int. Cl.[7] ................................................. G01B 3/18
(52) U.S. Cl. ...................................................... 33/815
(58) Field of Search .......................... 33/784, 816, 817, 33/815, 813, 831

(56) References Cited

U.S. PATENT DOCUMENTS

| 4,420,887 A | | 12/1983 | Sakata et al. | |
| 4,485,556 A | * | 12/1984 | Sakata et al. | 33/794 |
| 4,599,800 A | | 7/1986 | Wyrwich et al. | |
| 4,743,902 A | | 5/1988 | Andermo | |
| 4,873,771 A | * | 10/1989 | Wust | 33/802 |
| 5,495,677 A | | 3/1996 | Tachikake et al. | |
| 6,308,433 B1 | * | 10/2001 | Takahashi et al. | 33/819 |
| 6,553,685 B2 | * | 4/2003 | Nishina et al. | 33/815 |

FOREIGN PATENT DOCUMENTS

| JP | 59180401 A | * | 10/1984 | ............ G01B/3/18 |
| JP | 64-11883 | | 2/1989 | |

* cited by examiner

*Primary Examiner*—R Alexander Smith
(74) *Attorney, Agent, or Firm*—Rankin, Hill, Porter & Clark LLP (57) ABSTRACT

A rotary movement converting mechanism for converting a rotary movement of a rotary body (43) into a linear movement of a movable body (2) has a support body (42) fixed to a body frame (3) and provided with a slit (42A) along an axial direction of the rotary body (43), a spiral groove (43A) formed on the inner circumference of the rotary body (43), and a top member (41) provided on the movable body (2). The top member (41) has an engaging member (41 A) inserted through the slit (42A) and having a tip end engaged with the spiral groove (43A), and a stop member (41C) for stopping the linear movement of the movable body (2) when a load is applied on the linear movement of the movable body (2). Accordingly, when a load is applied on the linear movement of the movable body (2), the linear movement is stopped and the minute displacement of the movable body (2) is restrained, thereby enhancing the stability of a measuring instrument in measuring a workpiece.

15 Claims, 6 Drawing Sheets

ROTARY MOVEMENT CONVERTING MECHANISM AND MEASURING INSTRUMENT

BACKGROUND OF THE INVENTION

1. Field of the Invention

The present invention relates to a rotary movement converting mechanism for converting a rotary movement of a rotary body into a linear movement of a movable body, and a measuring instrument for measuring a displacement of a spindle in a linear direction.

2. Description of Related Art

Conventionally, a micrometer has been used as a measuring instrument for measuring a dimension of a workpiece by measuring a linear displacement of a spindle with an end of the spindle being abutted to the workpiece (see U.S. Pat. No. 5,495,677, FIG. 3).

The micrometer shown in the U.S. Pat. No. 5,495,677 has an inner sleeve fixed on a body frame, an outer sleeve provided on the outer circumference of the inner sleeve, a spindle, and a top member attached to the spindle. The spindle works as a support body having an end fixed to the body frame and a slit is formed on the circumference thereof along the moving direction of the spindle. The top member is attached to an end of the spindle, the top member having an engaging member projecting in a radial direction of the outer sleeve. An end of the engaging member is engaged with a spiral grove formed on the outer sleeve. The outer sleeve works as a rotary body, and the spindle (movable body) linearly moves in accordance with the rotation thereof with the rotation thereof being restricted.

According to the micrometer of the U.S. Pat. No. 5,495,677, in order to engage the end of the engaging member to the spiral groove formed on the outer sleeve in assembling the components, a clearance is necessarily formed between the spiral groove and the engaging member. Accordingly, when a load is applied on the spindle while the spindle is abutted to a workpiece, the top member is minutely displaced by the distance of the clearance. The spindle is also displaced in accordance with the minute displacement of the top member, which results in a measurement error. Since the clearance facilitates the movement of the engaging member, if the clearance is eliminated, the spindle is not smoothly moved on account of strong abrasion between the spiral groove and the engaging member.

SUMMARY OF THE INVENTION

An object of the present invention is to provide a rotary movement converting mechanism and a measuring instrument capable of restraining a minute displacement of a movable body when a load is applied on a linear movement of the movable body.

A rotary movement converting mechanism according to an aspect of the present invention is for converting a rotary movement into a linear movement, the mechanism comprising: a rotary body having a spiral groove on the inner circumference thereof; a movable body; a body frame; an approximately cylindrical support body fixed to the body frame and provided with a slit along an axial direction of the rotary body; a top member provided to the movable body, an engaging member of the top member being inserted through the slit so that a tip end of the engaging member is engaged with the spiral groove; and a stop member that stops a linear movement of the movable body when a load is applied on the linear movement of the movable body.

According to the above arrangement, since the top member is provided with the stop member and the top member is fixed by the stop member when a load is applied to the linear movement of the movable body, the minute displacement of the top member and the movable member can be restrained.

In the above aspect of the present invention, the stop member may preferably be a stick member that advances toward the inner circumference of the support body when the load is applied on the linear movement of the movable body.

According to the above arrangement, since the stop member advances to stop the linear movement of the movable body and the stick member having simple structure mainly works for stopping the linear movement, the internal structure of the rotary movement converting mechanism can be simplified.

In the above aspect of the present invention, the top member may preferably be capable of turning around an axis extending in a direction orthogonal to the axial direction of the rotary body, and the stop member may preferably advance in accordance with the turning movement of the top member.

According to the above arrangement, the top member is turned when a load is applied on the linear movement of the movable body and the stop member provided on the top member advances toward an inner wall of the internal support body to stop the linear movement of the top member and the movable body. In such arrangement, since the turning movement of the top member is used or advancing the stop member, the internal structure can be further simplified.

In the above aspect of the present invention, the top member may preferably be capable of turning around an axis extending in a direction orthogonal to the axial direction of the rotary body, and the stop member may preferably be engaged with the top member and the movable body and may preferably be pressed toward the inner circumference of the support body in accordance with the turning movement of the top member when the load is applied on the linear movement of the movable body.

According to the above arrangement, since the stop member engaged with the movable body is pressed toward the inner circumference of the support body in accordance with the turning movement of the top member when a load is applied to the linear movement of the movable body, the resistance of the linear movement of the movable body is increased. Accordingly, the linear movement of the movable body can be stopped and the position of the movable body can be maintained.

Further, since the stop member is pressed in accordance with the turning movement of the top member, the stop member can be interlinked with the turning movement of the top member, so that the linear movement of the movable body can be rapidly stopped.

Further, since the turning movement of the top member is used as a power for pressing the stop member toward the inner circumference of the support body, no other power is required for applying a pressure on the inner circumference of the support body by the stop member to terminate the linear movement of the movable body. Accordingly the structure of the rotary movement converting mechanism can be simplified.

In the above aspect of the present invention, the stop member may preferably be disposed on a side of the top member opposite to a side of the top member on which the engaging member is provided relative to the axial center of the movable body and may preferably be moved in a direction opposite to the moving direction of the movable body by the turning movement of the top member.

According to the above arrangement, the stop member disposed on a side opposite to the side of the top member on which the engaging member is provided is moved in a direction opposite to the moving direction of the movable body in accordance with the turning movement of the top member. Accordingly, a force in the moving direction of the top member and another force in the direction opposite thereto are applied on the movable body, so that the movement force applied on the movable body by the rotation of the rotary body can be canceled. Therefore, the position of the movable body when a load is applied on the linear movement can be securely maintained.

In the above aspect of the present invention, the stop member may preferably be disposed between the movable body and the support body and may preferably be provided with a tapered portion engaged with the top member on a first end thereof and projected in an out-plane direction toward a second end, and an end of the movable body may preferably be abutted to the tapered portion.

According to the above arrangement, since the tapered portion is formed on an end of the stop member disposed between the movable body and the support body and the end of the movable body is abutted to the tapered portion, the stop member is moved in a direction substantially orthogonal to the moving direction of the movable body in accordance with the inclination of the tapered portion when the stop member is moved in a direction opposite to the moving direction of the movable body. Accordingly, the stop member can be pressed to the inner circumference of the support body simultaneously with stopping the movable body by the movement in a direction opposite to the moving direction of the movable body by the stop member. Accordingly, the movable body can be rapidly and securely stopped by the stop member. Further, since the movable body is stopped by forming the tapered portion on an end of the stop member, the structure of the stop member can be simplified, thereby simplifying the structure of the rotary movement converting mechanism.

In the above aspect of the present invention, a spring for biasing the top member in a direction for preventing the turning movement of the top member may preferably be disposed between the movable body and the top member.

According to the above arrangement, the linear movement of the movable body can be prevented from being stopped by the turning movement of the rotary body when no load is applied to the linear movement of the movable body. In other words, the linear movement of the movable body stops only when a load is applied on the linear movement, thereby securely conducting and stopping the linear movement of the movable body.

A measuring instrument according to another aspect of the present invention is for measuring a displacement in a linear direction, the measuring instrument having the above-described rotary movement converting mechanism, in which the movable body is a spindle advanceable and retractable relative to the body frame, the support body is an inner sleeve having an end fixed to the body frame, and the rotary body is an outer sleeve.

According to the above aspect of the present invention, the minute displacement of the top member provided inside the measuring instrument can be prevented when an end of the spindle as a movable body touches the workpiece. Since the movement of the spindle can be prevented even when a load is applied on the spindle, thereby improving stability of the measuring instrument.

When the rotary body is rotated while an end of the spindle is in contact with the workpiece, the stop member is only further pressed to the inner wall of the internal support body and the position of the spindle stays constant, so that the pressure applied on the workpiece is not increased by further movement of the spindle. Accordingly, the pressure of the spindle applied on the workpiece can be kept substantially constant, thereby providing the measuring instrument with a constant-pressure function.

DETAILED DESCRIPTION OF PREFERRED EMBODIMENT(S)

[First Embodiment]
(1) External Structure

A first embodiment of the present invention will be described below with reference to the attached drawings.

Figure 1:
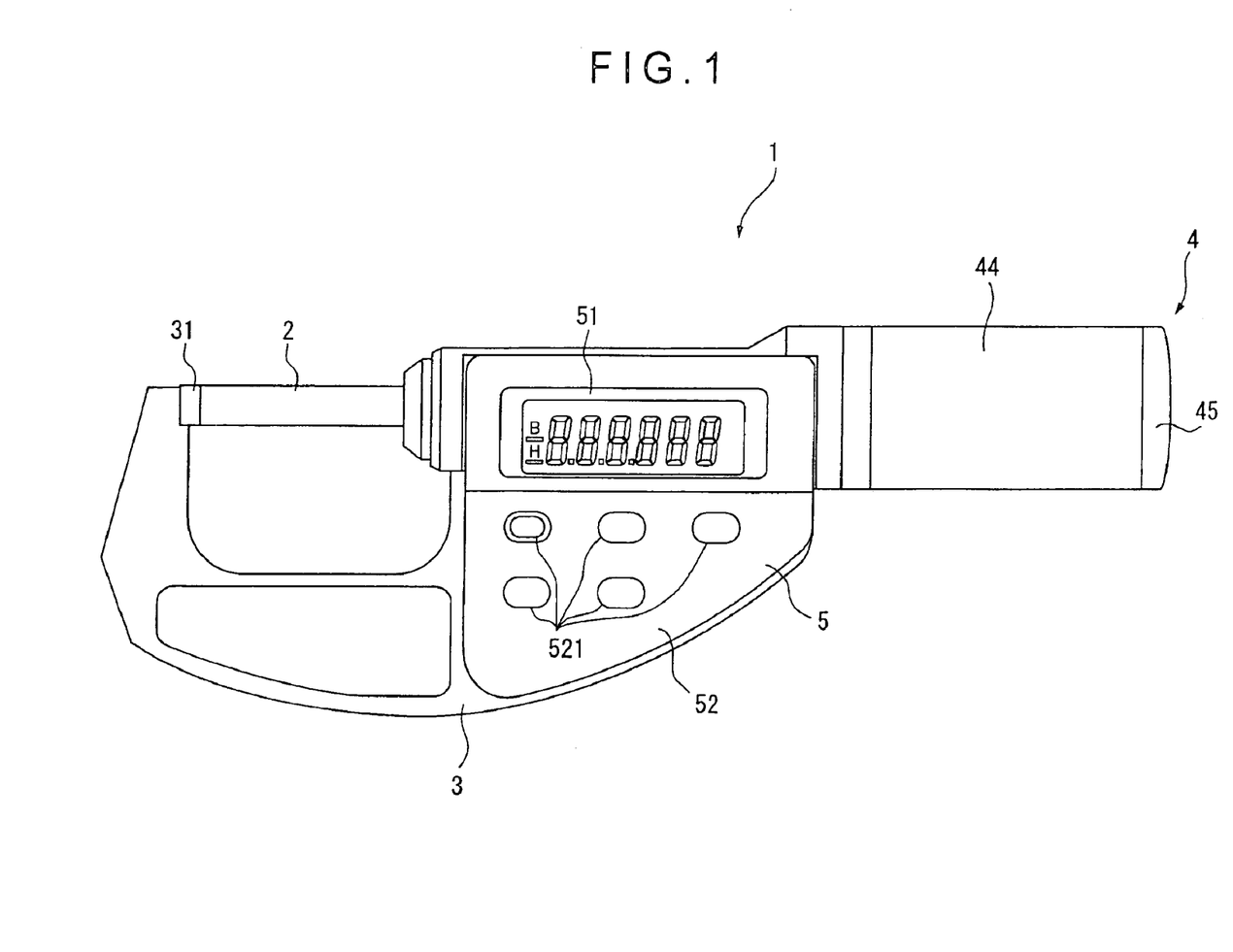
FIG. 1 is a front elevational view showing a digital-display micrometer according to a first embodiment of the present invention.

FIG. 1 is a front elevational view showing a digital-display micrometer as a measuring instrument of the first embodiment. In FIG. 1, a body 1 has a sealed internal structure and a spindle 2 (movable body) is attached to the body 1 in a projectable and retractable manner. The body 1 has a body frame 3 having approximately U-shaped cross section, and a spindle drive mechanism 4 (rotary movement converting mechanism) for advancing and retracting the spindle 2 in the axial direction thereof.

A detector (not shown) for detecting the displacement of the spindle 2 is provided inside the body frame 3 and a lid 5 is provided on the front side of the body frame 3. The detector is an electrostatic encoder, of which basis for measurement is a general one such as shown in Japanese Patent Publication No. Sho 64-11883 and Swedish Patent Application No. 7714010-1. The detector is electrically connected with a digital display 51 to display the displacement of the spindle on the digital display 51.

The lid 5 has the digital display 51 and an operation panel 52 on which a plurality of switches 521 are provided on the front side. The switches 521 provided on the operation panel 52 are for power on/off operation, origin setting, measurement value holding and the like.

The body frame 3 has an anvil 31 for the workpiece to be abutted on one of the openings thereof and the spindle 2 having an end to be abutted to the anvil 31 is pivotally supported on the other opening in a manner displaceable in the axial direction.

(2) Internal Structure

Figure 2A:
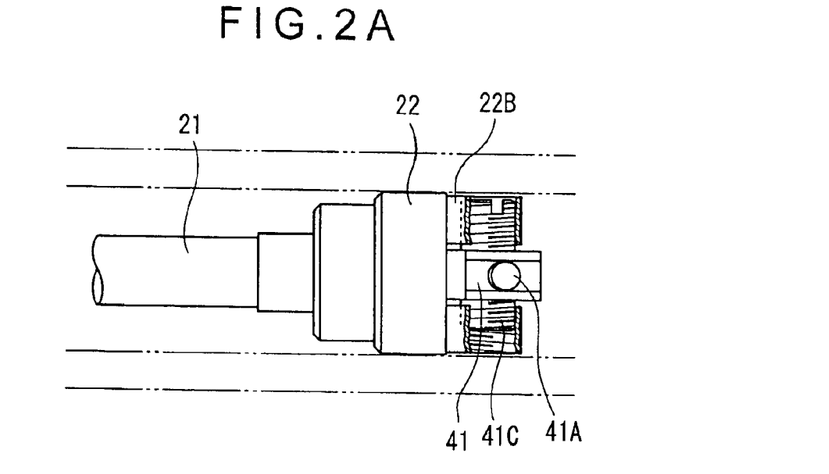
FIG. 2(A) is a plan view showing a primary portion of a spindle drive mechanism of the aforesaid embodiment.
Figure 2B:
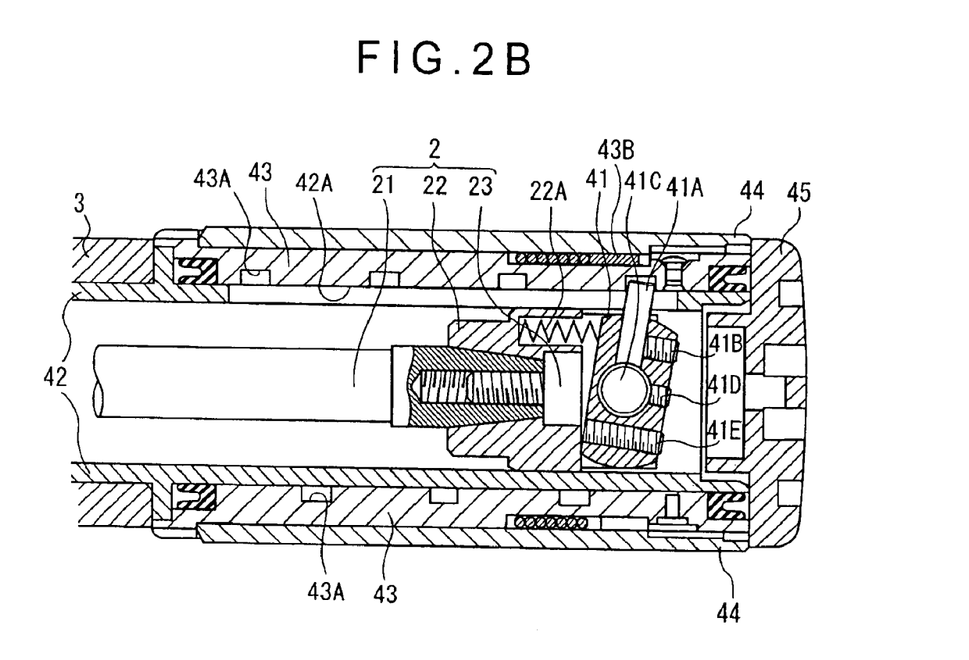
FIG. 2(B) is a cross section showing the spindle drive mechanism of the aforesaid embodiment.
Figure 3A:
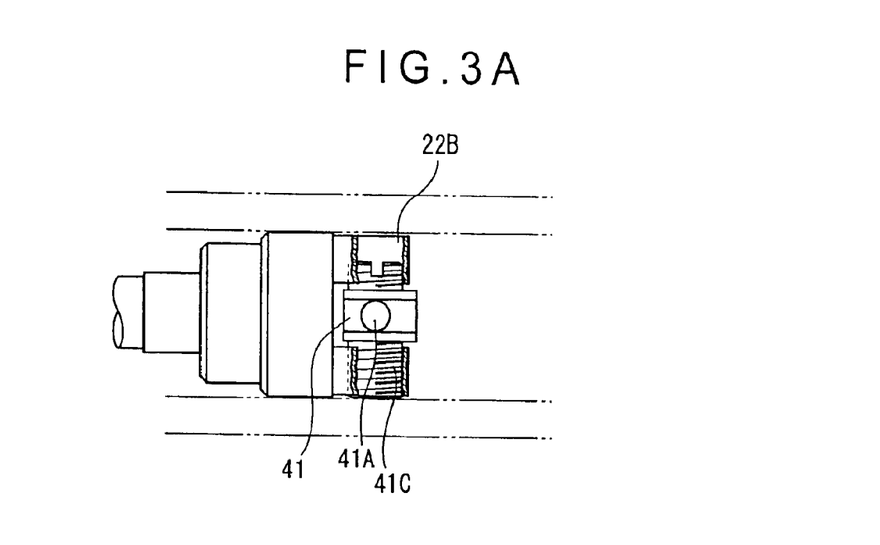
FIG. 3(A) is a plan view showing a primary portion of a spindle drive mechanism of the aforesaid embodiment.
Figure 3B:
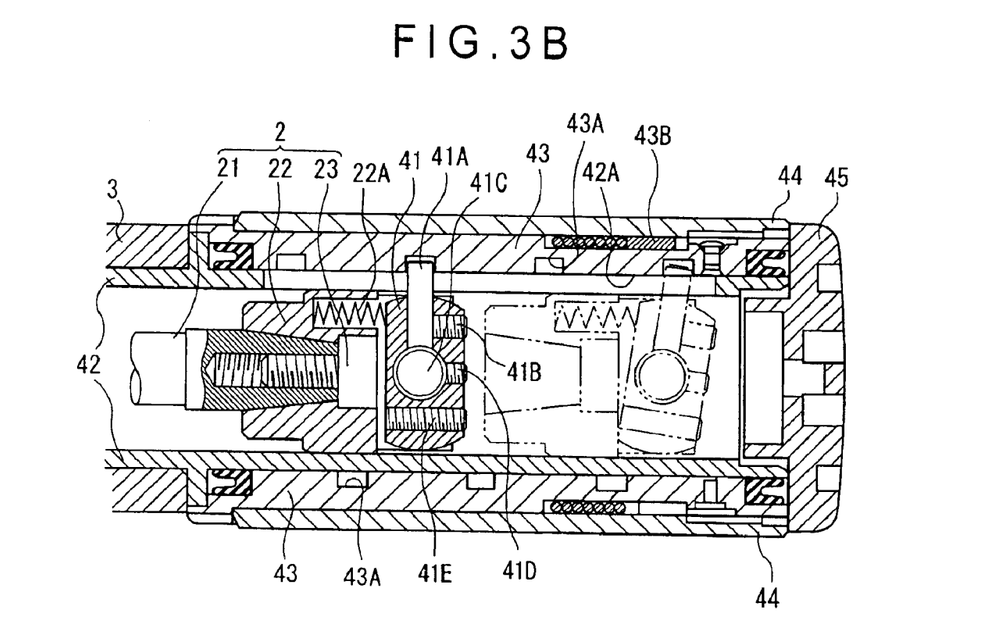
FIG. 3(B) is a cross section showing the spindle drive mechanism of the aforesaid embodiment.

FIG. 2 is an illustration of the spindle drive mechanism 4 with no load being applied on the linear movement of the spindle 2, and FIG. 3 is an illustration of the spindle drive mechanism 4 with a load being applied on the linear movement of the spindle 2. In the respective figures, (A) is a plan view showing a primary portion of the spindle drive mechanism 4 and (B) is a cross section showing the spindle drive mechanism 4. As shown in the figures, the spindle drive mechanism 4 has a top member 41 provided on the axial center of the spindle 2, and an inner sleeve 42, an outer sleeve 43 and a thimble 44 respectively disposed around the top member 41 toward the outside.

As shown in FIGS. 2 and 3, the spindle 2 has a spindle body 21 and a slide member 22. An end of the spindle body 21 abuts to a measured portion of a workpiece and the other end is fixed to the slide member 22 slidable in the inner sleeve 42 by a screw 23.

As shown in FIGS. 2(A) and 3(A), the slide member is shaped in an approximately U-shape having projections 22B on both sides thereof. A nut groove (not shown) extending in a direction orthogonal to the moving direction of the spindle 2 is formed inside the projection 22B and a clamp screw 41C is screwed to the nut groove as shown in FIGS. 2(A) and 3(A). The clamp screw 41C is a stick member working as a stop member for stopping the linear movement of the spindle 2, the clamp screw 41C being abutted to the inner circumference of the inner sleeve 42 in accordance with the advancement thereof. Incidentally, a top member 41 is fixed to the center of the clamp screw 41C by a setscrew 41D.

As shown in FIGS. 2(B) and 3(B), a spring 22A is buried on the inner circumference of the slide member 22. The spring 22A pivotally forces the top member 41 in clockwise direction in FIG. 2(B).

A pin-shaped engaging member 41A is provided on the top member 41 in a manner orthogonal to the axis of the clamp screw 41C. The engaging member 41A is attached to the top member 41 by the setscrew 41B. The engaging member 41A is inserted to a slit 42A formed along the axial direction of the inner sleeve 42, and an end of the engaging member 41A is engaged with a spiral groove 43A formed on the inner circumference of the outer sleeve 43. A positioning member 41E for determining the forced position of the top member 41 is forced by the spring 22A. The positioning member 41E is a screw provided on the top member 41, where the turn angle of the top member 41 is determined by adjusting the projected amount (screwed amount) from the spindle 2 side of the top member 41.

(3) Spindle Drive Mechanism (3-1) Arrangement

Figure 4:
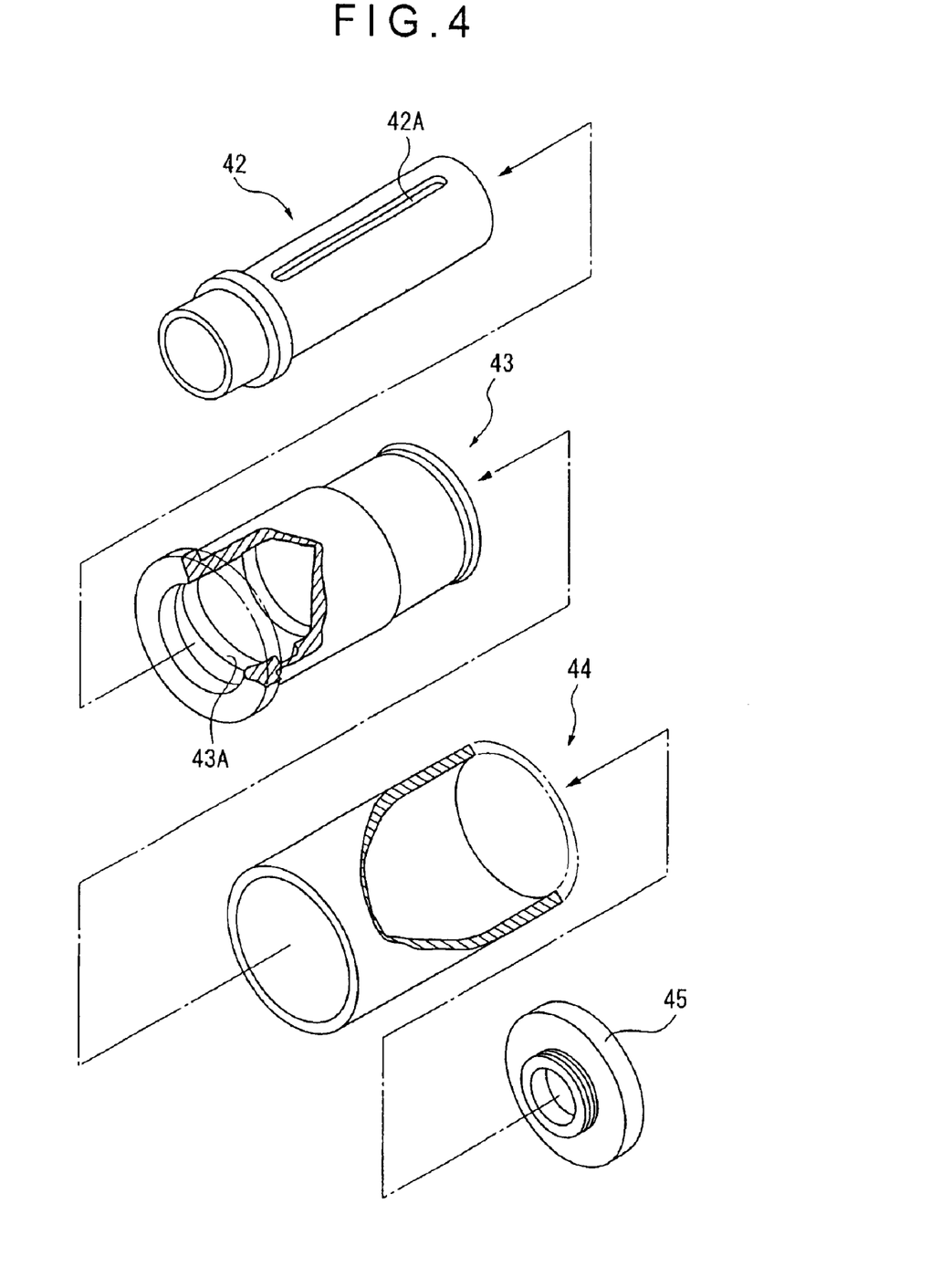
FIG. 4 is an exploded perspective view showing the arrangement of the spindle drive mechanism of the aforesaid embodiment.

FIG. 4 is a schematic perspective view showing an arrangement of the spindle drive mechanism 4.

As shown in FIGS. 2 and 4, the inner sleeve 42 (support body), the outer sleeve 43 (rotary body), and the thimble 44 are disposed coaxially with the spindle 2. The inner sleeve 42 has an approximately cylindrical shape with an end fixed to the body frame 3. Incidentally, an end cap 45 is attached to an end opposite to the end of the inner sleeve 42 fixed to the body frame 3, which prevents the outer sleeve 43 and the thimble 44 from being detached.

The outer sleeve 43 has an approximately cylindrical shape and is disposed in circumferentially rotatable manner along the outer circumference of the inner sleeve 42. The spiral groove 43A formed on the inner circumference of the outer sleeve 43 has a relatively large pitch, which specifically is greater than the screw pitch of a conventional micrometer so that high-speed operation of the spindle 2 can be conducted.

A plate spring 43B (not shown in FIG. 4) is provided on the outer circumference of the outer sleeve 43 to be engaged with the inner circumference of the thimble 44.

The thimble 44 has an approximately cylindrical shape, which is engaged with the outer circumference of the outer sleeve 43 in a circumferentially rotatable manner. A ratchet groove (not shown) for the spring 43B provided on the outer sleeve 43 to be engaged is formed on the inner circumference of the thimble 44 and the thimble 44 is engaged with the outer sleeve 43 through the spring 43B provided on the outer sleeve 43. Accordingly, the thimble 44 allows the rotation of the outer sleeve at a constant pressure when the spindle 2 is advanced, and the thimble 44 is freely rotated when the pressure exceeds a predetermined level.

(3-2) Function

The function of the spindle drive mechanism 4 will be described with reference to FIGS. 2 and 3.

When the thimble 44 is rotated in one direction, the rotary force thereof is transmitted to the outer sleeve 43 engaged with the thimble 44 through the spring 43B. Accordingly, the spiral groove 43A formed on the inner circumference of the outer sleeve 43 is rotated. In accordance with the rotation of the spiral groove 43A, the top member 41 is inclined to rotate in the same direction as the rotation of the outer sleeve 43 through the engaging member 41A engaged with the spiral groove 43A. However, since an end of the inner sleeve 42 having the slit 42A to which the engaging member 41A is inserted is fixed to the body frame 3, the rotation of the top member 41 in the same direction as the outer sleeve 43 is not allowed. Accordingly, the top member 41 is linearly moved in the axial direction of the outer sleeve 43. Since the top member 41 is biased by the spring 22A buried on the slide member 22, the linear movement of the top member 41 is transmitted to the slide member 22 to advance the spindle 2.

When the thimble 44 is reversely rotated, the force is reversely applied to retract the spindle 2.

When an end of the spindle 2 is not in contact with the measured portion of the workpiece, the top member 41 is inclined relative to the axial direction of the spindle 2 as shown in FIGS. 2(B) and 3(B). At this time, the clamp screw 41C provided on the top member 41 is not in contact with the inner wall of the inner sleeve 42 as shown in FIG. 2(A).

When the end of the spindle 2 is in contact with the measured portion of the workpiece, a load is applied to the spindle 2 against the advancement. Under such circumstances, when the thimble 44 is further rotated, the outer sleeve 43 is also rotated. The rotation of the outer sleeve 43 urges the top member 41 and, consequently, the spindle 2 to advance through the engaging member 41A.

However, the spindle 2 is in contact with the workpiece and cannot be further advanced. Accordingly, the top member 41 inclined relative to the axial direction of the spindle 2 is turned anticlockwise in FIG. 2(B) by the rotation of the outer sleeve 43 through the engaging member 41A against the biasing force of the spring 22A around the center of the clamp screw 41C so that the top member 41 opposes to the slide member 22 as shown in FIG. 3(B).

Since the clamp screw 41C is screwed to the nut groove of the slide member 22, the clamp screw 41C advances from a side of the projection 22B toward the inner circumference of the inner sleeve 42 in accordance with the turning movement of the top member 41. The end of the clamp screw 41C of the advanced top member 41 touches the inner circumference of the inner sleeve 42 as shown in FIG. 3(A) and the top member 41 is fixed to the inner circumference of the inner sleeve 42. Further, the movement of the spindle 2 is stopped in accordance with the fixing process of the top member 41. At this time, the engaging member 41A is fitted to the spiral groove 43A.

The top member 41 is released by reversely rotating the thimble 44. Specifically, when the thimble 44 is reversely rotated, the engaging member 41A is inclined by the biasing force of the spring 22A and the reverse rotation of the outer sleeve 43. The top member 41 and the spindle 2 are moved away from the anvil 31 by further rotation of the outer sleeve 43.

(4) Advantage of the First Embodiment

According to the first embodiment, following advantages can be obtained.

The clamp screw 41C as an engaging member for stopping the linear movement of the spindle 2 when a load is applied to the linear movement of the spindle 2 is provided on the top member 41. Accordingly, minute displacement of the spindle 2 can be restrained and stability in measuring a workpiece can be improved.

When an end of the spindle 2 touches the workpiece, since the rotation of the outer sleeve generated when the thimble is further rotated is converted into a force for advancing the clamp screw 41C to advance from a side of the projection 22B, the pressure applied on the workpiece is not increased by further advancement of the spindle 2, thereby achieving constant measurement pressure.

Since the clamp screw 41C advances and touches the inner circumference of the inner sleeve 42 when a load is applied on the linear movement of the spindle 2 to stop the spindle 2, the stick-shaped clamp screw 41C having a simple structure mainly works for stopping the spindle 2, thereby simplifying the internal structure of the body 1.

When the load is applied on the linear movement of the spindle 2, the top member 41 turns anticlockwise around the center of the clamp screw 41C and advances from a side of the projection 22B of the slide member 22 in accordance with the turning movement. According to the above arrangement, since the advancement of the clamp screw 41C is effected by the turning movement of the top member 41, the internal structure of the body 1 can be further simplified.

Since the spring 22A biased in a direction for preventing the rotation of the top member 41 is provided between the slide member 22 on the end of the spindle 2 and the top member 41, the top member 41 is not turned until a load is applied to the linear movement of the spindle 2. Accordingly, an erroneous operation where the top member 41 is turned to advance the clamp screw 41C to fix the spindle 2 while no load is applied on the linear movement of the spindle 2 can be prevented.

Since the positioning member 41E is provided on the top member 41, the turn angle of the top member 41 can be adjusted and the advancement amount of the clamp screw 41C can be easily adjusted. Specifically, the positioning member 41E is projected from the engaging surface of the top member 41 with the spring 22A to adjust the turn angle of the top member 41 so that the end of the clamp screw 41C advanced in accordance with the turning movement of the top member 41 touches the inner circumference of the inner sleeve 42, thereby adjusting the advancement amount of the clamp screw 41C.

[Second Embodiment]

Next, a digital-display micrometer as a measuring instrument according to a second embodiment of the present invention will be described below. The digital-display micrometer of the second embodiment has approximately the same arrangement as the digital-display micrometer shown in the first embodiment except for the arrangement and function of the spindle drive mechanism. In the following description, the same reference numeral will be attached to the components identical with or similar to the above-described components to omit description thereof.

Figure 5A:
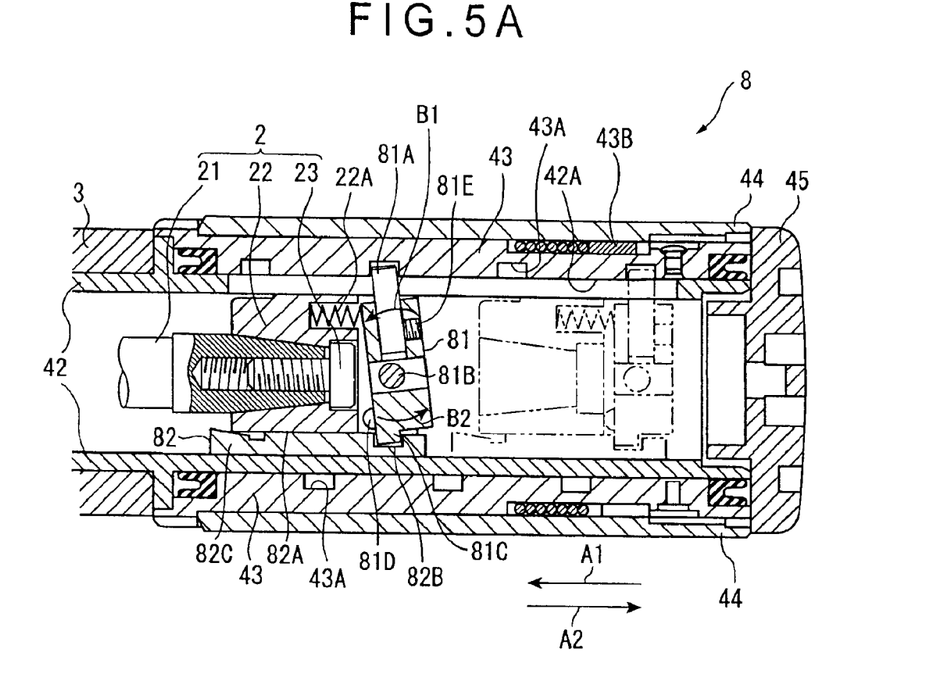
FIG. 5(A) is a cross section showing a spindle drive mechanism of a second embodiment of the present invention.
Figure 5B:
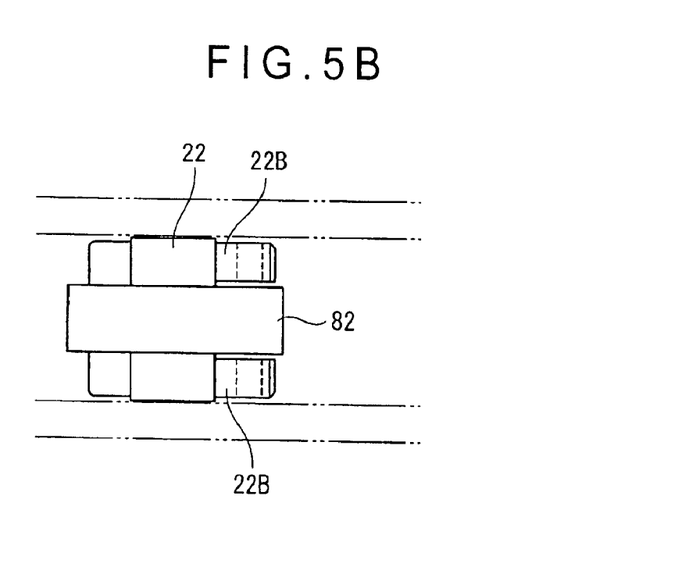
FIG. 5(B) is a plan view showing a primary portion of the aforesaid embodiment.

FIG. 5 are illustrations showing a spindle drive mechanism 8 of the digital-display micrometer according to the second embodiment, in which FIG. 5(A) is a cross section showing the spindle drive mechanism 8 and FIG. 5(B) is a plan view showing a primary portion of the spindle drive mechanism 8. Incidentally, FIG. 5(B) is an illustration showing the primary portion of the spindle drive mechanism 8 from the lower side in FIG. 5(A).

The digital-display micrometer according to the second embodiment has, though not illustrated, a body 1 (micrometer body), a spindle 2, a body frame 3 and the spindle drive mechanism 8.

As shown in FIG. 5, the spindle drive mechanism 8 has a top member 81 provided on the axial center of the spindle 2, a tapered key 82 (stop member) engaging with the top member 81 and the spindle 2 for stopping the spindle 2, and an inner sleeve 42, an outer sleeve 43 and a thimble 44 respectively disposed around the top member 81 and the tapered key toward the outside.

The top member 81 is a planarly-viewed rectangular component for converting the rotation of the thimble 44 into a linear movement of the spindle 2 in the same manner as the above-described top member 41, which is engaged with the projection 22B formed on the slide member 22 of the spindle 2, and a surface of the top member 81 opposed to the slide member 22 touches a tip end of the spring 22A buried in the slide member 22. An engaging member 81A is attached to the top member 81 by a setscrew 81E and an extension 81B, a projection 81C and a positioning portion 81D are formed on the top member 81.

The engaging member 81A is a pin-shaped component, which has an end inserted toward the slit 42A formed on the inner sleeve 42 to be engaged with the spiral groove 43A formed on the outer sleeve 43. The engaging member 81A is inserted to the central axis of the top member 81 from a direction substantially orthogonal to the central axis of the top member 81, i.e. a direction substantially orthogonal to the central axis of the spindle 2 when the top member 81 is engaged with the slide member 22 of the spindle 2, which is fixed to the top member 81 by the setscrew 81E inserted from a side of the top member 81.

The extension 81B is a stick-shaped component to be engaged with the slide member 22 to be a turn axis of the top member 81 in the same manner as the clamp screw 41C. An external thread (not shown) is formed on the outer circumference of the extension 81B and the external thread is engaged with the nut groove formed on the projection 22B of the slide member 22.

The projection 81C is a portion formed on a side opposite to the side on which the engaging member 81A is formed to be projected in an out-plane direction. Further, the projection 81C engages with the tapered key 82 to move the tapered key 82 by the turning movement of the top member 81. Incidentally, the movement of the tapered key 82 in accordance with the turning movement of the top member 81 will be described below in detail.

The positioning portion 81D projects from the side of the top member 81 opposing to the slide member 22 in an out-plane direction. The positioning portion 81D abuts to the slide member 22 to determine the position of the top member 81 relative to the slide member 22 together with the spring 22A provided on the slide member 22.

The tapered key 82 is disposed between the slide member 22 and the inner sleeve 42, which is a plate member engaging with the slide member 22 and the top member 81. An abutting surface 82A for a side of the slide member 22 to be abutted is formed on the tapered key 82 approximately at the longitudinal center thereof, and the tapered key 82 has a groove 82B at the base side and a tapered portion 82C at the distal side thereof.

The groove 82B is a groove formed in a direction orthogonal to the longitudinal direction of the tapered key 82, to which the projection 81C formed on the top member 81 is engaged. The length of the groove 82B in the longitudinal direction of the tapered key 82 is greater than the length of the projection 81C in the same direction.

The tapered portion 82C is formed in a tapered shape so that the thickness of the tapered key 82 becomes greater toward the distal end of the tapered key 82. The distal end of the tapered portion 82C projects toward the axial center of the spindle 2 relative to the side of the slide member 22 that is in contact with the abutting surface 82A. When the distal end of the slide member 22 is in contact with the tapered portion 82C, the movement of the slide member 22 toward the distal side is retrained to restrict the movement of the spindle 2.

The function of the spindle drive mechanism 8 will be described below.

When the thimble 44 is rotated in a direction in the same manner as the spindle drive mechanism 4 described in the first embodiment, the rotation is transmitted to the outer sleeve 43 to rotate the outer sleeve 43. The rotation moves the top member 81 in a direction for the slit 42A to be formed through the engaging member 81A engaging with the spiral groove 43A formed on the inner circumference of the outer sleeve 43 and inserted to the slit 42A of the inner sleeve 42. When the top member 81 is moved in a direction shown by an arrow A1, the slide member 22 engaged with the top member 81 through the spring 22A and the tapered key 82 engaged with the top member 81 through the projection 81C formed on the top member 81 are moved in the direction of arrow A1 by being pushed by the top member 81.

When the anvil 31 provided at the distal end of the spindle 2 is in contact with the workpiece, the linear movement of the spindle 2 is stopped. When the thimble 44 is further rotated, as shown in a solid line in FIG. 5(A), the top member 81 is turned in a direction of an arrow B1 around the extension 81B. Since the projection 81C formed on an end of the top member 81 is moved in a direction of an arrow B2 in accordance with the turning movement of the top member 81, the tapered key 82 engaged with the projection 81C is moved in a direction of an arrow A2 opposite to the arrow A1. The movement of the tapered key 82 brings the distal end of the slide member 22 touching the abutting surface 82A of the tapered key 82 into contact with the tapered portion 82C of the tapered key 82, so that the movement of the slide member 22 in the direction of the arrow A1 urged by the turning movement of the top member 81 is restricted.

When the tapered key 82 is urged to move in the A2 direction, the tapered key 82 is pushed to the inner circumference of the inner sleeve 42 in accordance with the inclination of the tapered portion 82C, so that a pressure is applied to the inner sleeve 42 from the inner side thereof. The pressure increases the resistance against the movement of the slide member 22, which works as a brake. Accordingly, the slide member 22 is stopped by the tapered key 82, so that the movement in the arrow A1 direction is restricted.

When the thimble 44 is rotated in a direction reverse to the above direction while the spindle 2 is stopped, the top member 81 is turned in a direction opposite to the direction shown by the arrows B1 and B2. In accordance with the turning movement, the tapered key 82 is moved in the arrow A1 direction being pushed by the projection 81C formed on the top member 81, to release pushing onto the inner circumference of the inner sleeve 42. When the thimble 44 is further rotated, the top member 81 is moved in the arrow A2 direction and the tapered key 82 is also moved in the arrow A2 direction in accordance therewith. Since the slide member 22 of the spindle 2 is abutted to the abutting surface 82A and the tapered portion 82C formed on the tapered key 82, the slide member 22 is moved in the arrow A2 direction in accordance with the movement of the tapered key 82.

According to the second embodiment of the present invention, following advantages can be obtained.

The spindle drive mechanism 8 has the tapered key 82 engaged with the slide member 22 of the spindle 2 (movable body) and the top member 81 for advancing and retracting the spindle 2. When a load is applied to the linear movement of the spindle 2, the tapered key 82 moves in a direction opposite to the linear movement in accordance with the turning movement of the top member 81 to stop the slide member 22 and is pushed onto the inner circumference of the inner sleeve 42. According to the above arrangement, since the tapered key 82 engaging with the slide member 22 stops the spindle 2 and increases the resistance for the movement of the spindle 2, the movement of the spindle 2 can be further restrained. Accordingly, the position of the spindle 2 can be maintained.

The tapered key 82 is moved in a direction opposite to the linear movement of the spindle 2 and is pressed to the inner circumference of the inner sleeve 42 in accordance with the turning movement of the top member 81, the linear movement of the spindle 2 can be restrained in accordance with the turning movement of the top member 81 when a load is applied to the linear movement. Accordingly, the position of the spindle 2 can be rapidly fixed when a load is applied on the linear movement.

The spindle 2 is stopped by the tapered key 82, i.e. the tapered key 82 is moved in a direction opposite to the moving direction of the spindle 2 (the arrow A1 in FIG. 5), and is pushed toward the inner sleeve 42 by virtue of the turning force of the top member 81. Accordingly, the tapered key 82 can be moved and pushed with a simple arrangement, thereby simplifying the structure of the spindle drive mechanism 8.

The tapered key 82 is engaged with the projection 81C formed on an end of the top member 81 opposite to the end on which the engaging member 81A is provided. Accordingly, the moving force of the spindle 2 in the linear movement direction generated by the turning movement of the top member 81 and transmitted by the spring 22A buried on the slide member 22 can be canceled by the moving force of the tapered key 82 applied in the opposite direction by the projection 81C of the top member 81. Accordingly, the position of the spindle 2 can be securely maintained without changing the position of the spindle 2.

The portion of the tapered key 82 touching the end of the slide member 22 has the tapered section 82C formed in a tapered shape projecting in the out-plane direction toward the distal end of the tapered key 82. Accordingly, since the tip end of the slide member 22 is abutted to the tapered portion 82C in accordance with the movement of the tapered key 82 by the turning movement of the top member 81, the tapered key 82 can be pressed to the inner circumference of the inner sleeve 42 simultaneously with stopping the slide member 22 by the movement of the tapered key 82 during the turning movement of the top member 81. Further, since the slide member 22 is stopped by the tapered portion 82C of the tapered key 82, the structure of the tapered key 82 and, consequently, the spindle drive mechanism 8 can be simplified, thereby securely stopping the spindle 2 with a simple structure.

The rotation of the thimble 44 linearly moves the top member 81 and the spindle 2 through the spiral groove 43A on the outer sleeve 43 and the engaging member 81A engaged with the spiral groove 43A and inserted through the slit 42A of the inner sleeve 42. When a load is applied to the linear movement of the spindle 2, the top member 81 is turned by the turning movement of the thimble 44 around the extension 81B. Though the turning movement of the top member 81 urges the slide member 22 to move in the moving direction of the spindle 2 (in the direction of the arrow A1 in FIG. 5), the movement of the slide member 22 is restrained by the tapered key 82 moving in the opposite direction (in the direction of the arrow A2 in FIG. 5) and pressed to the inner circumference of the inner sleeve 42. Accordingly, when the thimble 44 is rotated after a load is applied on the linear movement of the spindle 2, the movement of the slide member 22 provided on the spindle 2 can be restrained, so that the pressure applied on the workpiece abutted to the anvil 31 is kept substantially constant, thereby achieving constant measurement pressure in measuring a workpiece.

The top member 81 is biased in a direction for preventing the turning movement thereof by the spring 22A buried in the slide member 22. According to the above arrangement, as in the above-described first embodiment, the top member 81 is prevented from turning and stopping the linear movement of the spindle 2 when no load is applied on the linear movement of the spindle 2, thereby stabilizing the linear movement of the spindle 2.

Incidentally, the scope of the present invention is not restricted to the above-described embodiments, but includes modifications and improvements as long as an object of the present invention can be achieved.

Though a digital-display micrometer is used in the above-described embodiments, the arrangement is not limiting. In other words, the present invention may be applied to a non-digital-display micrometer. Alternatively, the present invention may be applied to a measuring instrument such as a Holtest, a depth meter and a micrometer head. The present invention may be applied to a device other than a measuring instrument such as a device for positioning a soft component.

Though the spring 22A biases the top member in a direction for preventing the turning movement of the top member in the above-described embodiments, an elastic body such as rubber may be used in the present invention.

Though the engaging members 41A and 81A are pin-shaped in the above-described embodiments, such arrangement is not limiting. In other words, the engaging member may be designed in any shape as long as the distal end of the engaging member 41A can be engaged with the spiral groove 43A and the engaging member 41A can be inserted through the slit 42A. However, with the pin-shaped configuration, the engaging member can be easily engaged with the spiral groove 43A, the width of the slit 42A can be set relatively narrow and the internal structure of the body 1 can be simplified.

Though an electrostatic encoder is used as the detector, such arrangement is not limiting but a photoelectric or magnetic encoder may be used.

Figure 6:
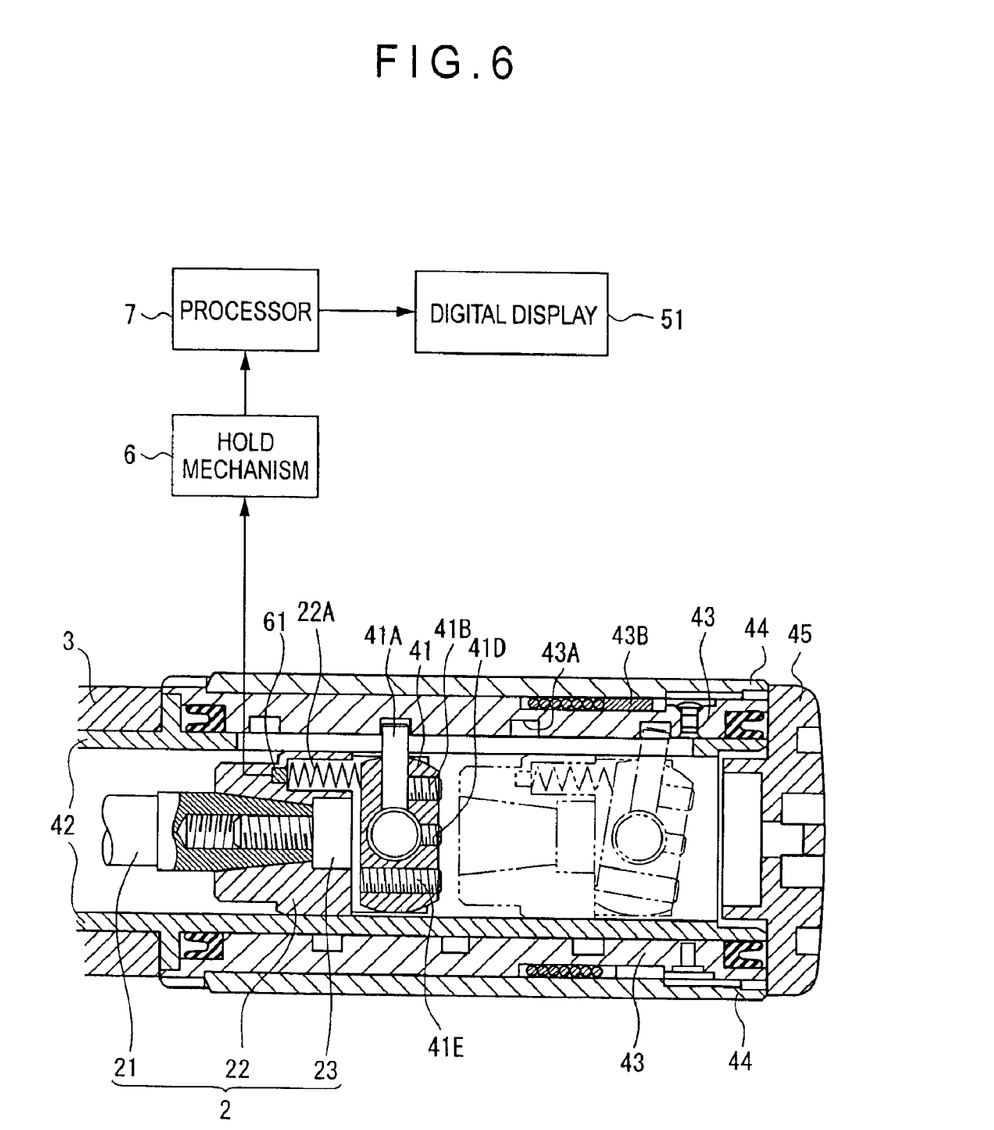
FIG. 6 is an illustration of a modification of the present invention.

In the present invention, a hold mechanism that holds the detected measurement value may be used as shown in FIG. 6.

FIG. 6 is an illustration corresponding to FIG. 3(B) of the above-described first embodiment. In the figure, a hold switch 61 is provided on the bottom of the spring 22A buried in the slide member 22 and is electrically connected to a hold mechanism 6. When the hold switch 61 is set on, the hold mechanism 6 sends an electric signal of hold command to a processor 7 for calculating the detected result from the detector for detecting the displacement of the spindle 2 as a length of a workpiece. The calculation result of the processor 7 is outputted to and displayed on the digital display 51. Incidentally, when no load is applied to the linear movement of the spindle 2, the hold switch 61 is set off, so that no measurement value is held.

Specifically, when no load is applied to the linear movement of the spindle 2, since no great load is applied on the spring 22A, the hold switch 61 is kept off. Accordingly, the hold switch 61 does not send an electric signal of the hold command to the hold mechanism 6 and the processor 7 calculates the results detected by the detector. When the thimble 44 is further rotated after a load is applied on the linear movement of the spindle 2 by bringing an end of the spindle 2 into contact with the workpiece, the top member 41 is turned to apply a great load on the spring 22A. The hold switch 61 provided on the bottom of the spring 22A is set on by the applied load. The hold switch 61 then sends an electric signal of a hold command to the hold mechanism 6, and the signal is transmitted to the processor 7 to hold the measurement value. The hold measurement value is outputted to the digital display 51 and, when an external device is connected to the body 1, to the external device.

The hold switch 61 may be a spring-type switch, or a pressure sensor may be provided instead of a switch. In the latter arrangement, a predetermined pressure is set and, when the pressure of the spring 22A exceeds the predetermined pressure by the turning movement of the top member 41, the measurement value is held.

According to the above arrangement, since the measured value is automatically held, the measurement stability can be further enhanced.

Incidentally, the hold mechanism 6 may be used for the digital-display micrometer described in the second embodiment to achieve approximately the same advantages as the above-described advantages.

Though the clamp screw 41C is used in the first embodiment and the tapered key 82 is used in the second embodiment as the stop member, both of the clamp screw and the tapered key may be simultaneously used. In other words, the clamp screw and the tapered key may be provided to a single spindle drive mechanism, thereby further securely stopping the spindle 2. The hold mechanism for holding the measured value may be provided to the above arrangement.

What is claimed is:

1. A rotary movement converting mechanism for converting a rotary movement into a linear movement comprising:

a rotary body having a spiral groove on an inner circumference thereof;

a movable body;

a body frame;

an approximately cylindrical support body fixed to the body frame and provided with a slit along an axial direction of the rotary body;

a top member provided to the movable body, an engaging member of the top member being inserted through the slit so that a tip end of the engaging member is engaged with the spiral groove; and a stop member that stops a linear movement of the movable body when a load is applied to the linear movement of the movable body, the stop member having a face that is movable into contact with the inner circumference of the support body.

2. The rotary movement converting mechanism according to claim 1, wherein the stop member is a stick member that advances toward the inner circumference of the support body when the load is applied on the linear movement of the movable body.

3. The rotary movement converting mechanism according to claim 2, wherein the top member is capable of turning around an axis extending in a direction orthogonal to the axial direction of the rotary body, and wherein the stop member advances in accordance with the turning movement of the top member.

4. The rotary movement converting mechanism according to claim 3, wherein a spring for biasing the top member in a direction for preventing the turning movement of the top member is disposed between the movable body and the top member.

5. The rotary movement converting mechanism according to claim 1, wherein the top member is capable of turning around an axis extending in a direction orthogonal to the axial direction of the rotary body, and wherein the stop member is engaged with the top member and the movable body and is pressed toward the inner circumference of the support body in accordance with the turning movement of the top member when the load is applied on the linear movement of the movable body.

6. The rotary movement converting mechanism according to claim 5, wherein the stop member is disposed on a side of the top member opposite to a side of the top member on which the engaging member is provided relative to the axial center of the movable body and is moved in a direction opposite to the moving direction of the movable body by the turning movement of the top member.

7. The rotary movement converting mechanism according to claim 5, wherein the stop member has a first end and a second end, and is disposed between the movable body and the support body, said stop member first end being with the top member and said stop member second end including a tapered portion, and wherein an end of the movable body is adapted to abut the tapered portion.

8. A measuring instrument for measuring a displacement in a linear direction, comprising: a rotary movement converting mechanism according to claim 1, wherein the movable body is a spindle advanceable and retractable relative to the body frame, the support body is an inner sleeve having an end fixed to the body frame, and the rotary body is an outer sleeve.

9. The rotary movement converting mechanism according to claim 1, wherein the top member is capable of tuning around an axis extending in a direction orthogonal to the axial direction of the rotary body, and wherein tuning movement of the top member causes the stop member to linearly advance toward the inner circumference of the support body.

10. The rotary movement converting mechanism according to claim 9, wherein the stop member defines the top member turning axis and moves in a direction orthogonal to the axial direction of the rotary body.

11. The rotary movement converting mechanism according to claim 1, wherein the top member is capable of turning around an axis extending in a direction orthogonal to the axial direction of the rotary body, and wherein the stop member is engaged with the top member and the movable body and is disposed between the movable body and the support body, whereby turning movement of the top member upon application of the load on linear movement of the movable body presses the stop member toward the inner circumference of the support body.

12. The rotary movement converting mechanism according to claim 11, wherein the stop member is disposed on a side of the top member opposite to a side of the top member on which the engaging member is provided relative to the axial center of the movable body and is slidably moved in a direction opposite to the moving direction of the movable body by the turning movement of the top member.

13. The rotary movement converting mechanism according to claim 11, wherein the stop member includes a tapered portion and wherein the movable body is adapted to engage said tapered portion to press the stop member toward the support body inner circumference.

14. The rotary movement converting mechanism according to claim 13, wherein stop member has a first end and a second end, and wherein said tapered portion has a thickness that increases toward a second end of said stop member.

15. The rotary movement converting mechanism according to claim 14, wherein said top member engages the first end of said stop member.

* * * * *